Sept. 14, 1954  W. G. DE KAM  2,688,870
GAS PER MILE GAUGE
Filed Aug. 23, 1951
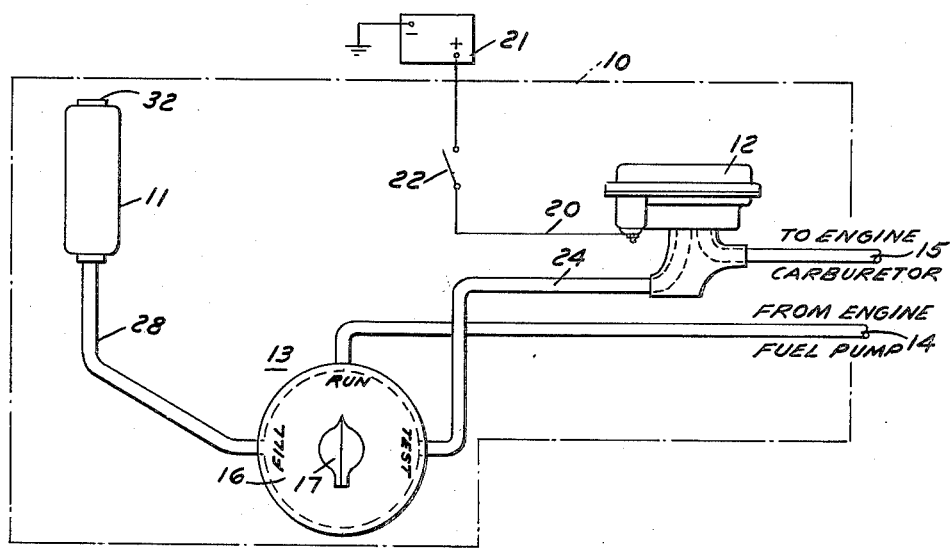
FIG. 1
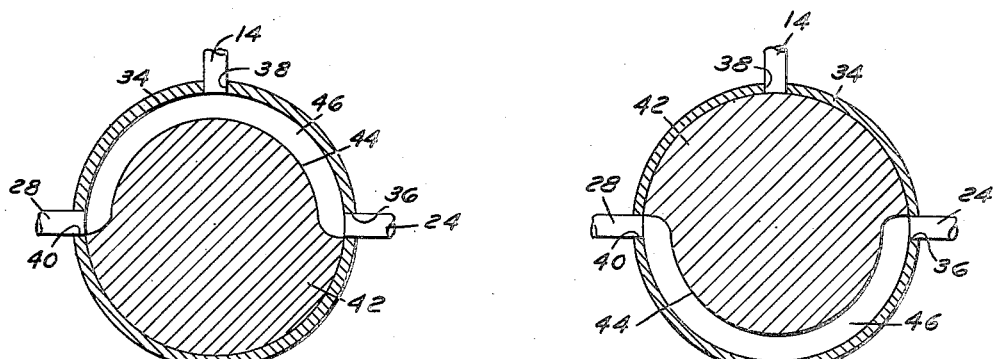
FIG. 2  FIG. 4  FIG. 3
FILL  TEST
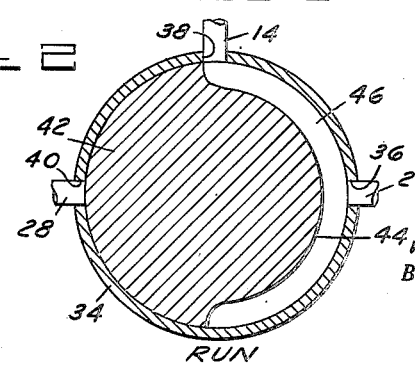
RUN
INVENTOR.
WILLIAM G. DE KAM
BY
Burton & Parker
ATTORNEYS Patented Sept. 14, 1954

2,688,870

UNITED STATES PATENT OFFICE 2,688,870

GAS PER MILE GAUGE

William G. De Kam, Detroit, Mich., assignor to Kent-Moore Organization, Inc., Detroit, Mich., a corporation of Michigan Application August 23, 1951, Serial No. 243,282

1 Claim. (Cl. 73—113)

This invention relates to a device for measuring the gasoline mileage of an internal combustion engine of an automobile or the like.

An object is to provide a testing apparatus which will measure and feed to the carburetor of a motor vehicle a unit volume of fuel at the normal working pressure of the vehicle's fuel pump.

Another object is to provide a mileage tester having a burette or similar measuring container which may be hung inside the vehicle within view of the driver, and which is filled with a measured quantity of fuel by the engine fuel pump, which measured quantity of fuel is then discharged to the engine carburetor by the fuel pump of the mileage tester. The distance traveled by the vehicle during the discharge of this measured quantity of fuel gives the miles traveled per unit volume of fuel consumed.

Another object is to provide a gasoline mileage tester which requires only one break in the vehicle fuel line for installation, and which may be easily and quickly installed in the line between the fuel pump and the carburetor. Heretofore many devices have required more than one break in the line for installation.

A further object is to provide a mileage testing device insertable in the fuel line of the vehicle between the carburetor and fuel pump as set forth above comprising a measuring container and a fuel pump with a three-way valve and connections therefor, which valve may be selectively positioned either to prepare the apparatus for testing, to test the fuel consumption of the engine, or to feed fuel directly from the engine's fuel pump to the carburetor without running the test.

The device further serves the meritorious advantage of indicating whether the engine fuel pump is properly functioning.

A further object is the provision of a gasoline mileage tester that is easily and economically manufactured.

Other objects, advantages, and meritorious features will appear in the following specification, claims and drawings, wherein:

Fig. 1 is a schematic view of the testing device including the lines from the engine fuel pump and the carburetor, and showing the pointer and dial face of the three-way valve;

Fig. 2 is a transverse sectional view of the three-way selector valve shown in Fig. 1, in the "Fill" position, wherein all of the ports in the valve casing are interconnected;

Fig. 3 is a transverse sectional view of the three-way selector valve shown in Fig. 1, in the "Test" position, wherein the tube connected with the engine fuel pump is closed and the tubes connecting the measuring chamber and the tester's fuel pump are interconnected;

Fig. 4 is a transverse sectional view of the three-way selector valve shown in Fig. 1, in the "Run" position, wherein the tube to the measuring chamber is closed and the tubes connecting the engine fuel pump and the tester's fuel pump are interconnected.

Referring to the drawings, the dotted outline 10, Fig. 1, indicates a casing or housing for the test apparatus. Brackets or hooks (not shown), may be secured to this housing to suspend it from the dashboard or window opening of the vehicle. Suitably disposed within the casing is a burette or measuring container 11, an electric fuel pump 12, and a three-way valve 13. A dial face 16 is described on an exterior wall of the casing and is marked with "Run," "Fill," and "Test." A rotatable pointer 17 connected, as hereinafter described to the valve 13, overlies the dial face.

It is understood that the device is employed in association with conventional motor vehicle gasoline engine apparatus provided with a carburetor, fuel pump and battery.

Tubing 14 communicates with the discharge side of the engine fuel feed pump. Tubing 15 communicates with the engine carburetor. That portion of tubing 14 and 15 lying outside the housing is preferably flexible, while those portions inside the housing are substantially resilient.

Tube 14 passes through the wall of the housing and communicates with the three-way selector valve 13. Tube 15 passes through the wall of the housing and communicates with the discharge side of the electric fuel pump 12. A tube 24 connects the intake side of said pump with the selector valve 13.

The tester's pump 12 is of a standard make, such as an electro-magnetic diaphragm type. It is energized through lead wire 20 connected to the vehicle's battery 21, and is grounded through the vehicle's frame. A switch 22 connected in the lead wire 20 serves to selectively complete the circuit.

Tube 28 provides a passageway from the selector valve 13 to the transparent burette or measuring container 11. The casing 10 is transparent at that portion of its side walls enclosing the burette so that the latter may be easily viewed by the operator of the motor vehicle. The burette is graduated to measure any convenient volume of fuel, such as one-tenth ($\frac{1}{10}$) of a gallon. The burette is freely vented to the atmosphere at its top wall as at 32.

Figs. 2, 3 and 4 show detailed views of the selector valve 13 in different operating positions. The valve comprises a casing 34, ported as at 36, 38, and 40, each port being adapted to respectively receive the ends of tubes 24, 14, and 28. A rotatable valve body 42 is mounted within this casing. The pointer 17 is coupled to said valve body. The valve body is peripherally cut away as at 44 providing a passage 46 between the inner wall of the casing and the valve body to selectively communicate with the aforementioned ports of the valve casing.

When the valve body is in the "Fill" position as is shown in Fig. 2, all of the ports are open to passage 46, while in other positions only two of the ports are open, as is evident from the drawings.

To install and operate the tester, the fuel discharge line from the vehicle's fuel pump to the carburetor is disconnected at any convenient point. Tube 14 of the tester is attached to the discharge line of the pump. Tube 15 is attached to the intake side of the carburetor. The tester housing is hung inside the vehicle so that the burette is visible and the pointer 17 on the selector valve 13 is within reach of the driver. The pointer on the selector valve is turned to the "Run" position as shown in Figs. 1 and 4. The wire 20 from the tester's electric fuel pump 12 is connected to the vehicle's battery and the switch 22 is turned on. The vehicle's engine is then started.

The selector valve being in the "Run" position, fuel from the engine fuel pump flows through tube 14 to the selector valve, into and through passage 46 in the valve, out through port 36 in the valve casing and through tube 24 to the tester's electric fuel pump, and from there to the carburetor. Consequently, when the selector valve is in the "Run" position the fuel is fed to the carburetor by means of the engine fuel pump and the tester's electric fuel pump.

To test the fuel consumption of the engine the pointer on the selector valve is moved from the "Run" position to the "Fill" position shown in Fig. 2. In the latter position the valve body admits fuel from the tube 14 into the passage 46 and out through ports 36 and 40 into the tubes respectively connected thereto. Fuel passing into tube 24 enters the carburetor as hereinbefore described. The fuel entering tube 28 flows into the burette, the air in the burette being vented through 32 in the top wall. It will be noted that the engine fuel pump is now feeding fuel both to the electric fuel pump and the burette.

If the engine fuel pump is defective it will not properly fill the burette, and so a test to determine whether the vehicle's fuel pump is functioning properly is accomplished by this invention.

When the burette has been filled with a measured volume of fuel, the driver of the vehicle moves the pointer on the selector valve to the "Test" position shown in Fig. 3. In this position port 38 and tube 14 are blocked by the valve body, while ports 36 and 40 and their respective tubes are open to passage 46. Because tube 14 is blocked at the selector valve no further fuel from the engine fuel pump enters the tester or the carburetor. The only fuel entering the carburetor is that which feeds from the burette. The fuel from the burette by gravity and by suction feeds to the selector valve, through passage 46 and then to the electric fuel pump from which it is fed under a pressure similar to that of the normal working pressure of the engine fuel pump, to the carburetor. The distance traveled by the vehicle, as recorded by the speedometer dial during the time it takes to empty the burette, is the mileage per unit volume of gasoline.

When the unit volume of fuel measured by the burette is exhausted, the pointer on the selector valve is returned either to the "Run" or "Fill" position depending upon whether another test is to be performed.

What I claim is:

In a device for measuring the fuel consumption of an internal combustion engine having a fuel pump connected to a carburetor by a fuel line through which fuel is discharged from the pump to the carburetor, the combination comprising: a three-way valve having three ports, an intake line coupled at one end with one port of the valve and adapted to be removably coupled at the other end with the fuel line when the same is disconnected from the carburetor, a discharge line coupled at one end with another port of the valve and adapted to be removably coupled at the other end with the carburetor when the fuel line is disconnected therefrom, a burette, a third line connecting the burette with the third port of the valve to conduct fuel to and from the burette and the valve, an electric fuel pump connected in the discharge line between the valve and the end of the line adapted to be removably coupled with the carburetor, said valve operable to one position to receive fuel through said intake line from the engine fuel pump and pass the fuel to the carburetor through the discharge line and block the passage of fuel to the burette, said valve operable to another position to receive fuel from the engine pump through the intake line and pass the fuel to both the intake side of the electric pump and to the burette, said valve operable to a third position to receive fuel from the burette through said third line and pass the fuel to the intake side of the electric pump and block any communication between the engine fuel pump and the fuel passing from the burette to the electric pump.

References Cited in the file of this patent

UNITED STATES PATENTS

| Number | Name | Date |
| --- | --- | --- |
| 1,718,553 | Gauthier | June 25, 1929 |
| 2,073,243 | Liddell et al. | Mar. 9, 1937 |
| 2,215,680 | Wiley et al. | Sept. 24, 1940 |
| 2,309,386 | Gauthier | Jan. 26, 1943 |